(12) United States Patent
Chen

(10) Patent No.: US 8,106,907 B2
(45) Date of Patent: Jan. 31, 2012

(54) LEAPING ITERATIVE COMPOSITION METHOD OF COMPLICATED GRAPHIC AND STORAGE MEDIUM HAVING COMPUTER PROGRAM EXECUTING THE SAME

(75) Inventor: Ming-Jang Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 985 days.

(21) Appl. No.: 12/053,361

(22) Filed: Mar. 21, 2008

(65) Prior Publication Data
US 2009/0237407 A1 Sep. 24, 2009

(51) Int. Cl.
*G06T 17/00* (2006.01)
(52) U.S. Cl. ............... 345/428; 345/419; 345/581
(58) Field of Classification Search ........... 345/428, 345/419, 581
See application file for complete search history.

(56) References Cited

U.S. PATENT DOCUMENTS

| 5,831,633 | A | 11/1998 | Van Roy |
| 7,098,917 | B2 | 8/2006 | Kurzweil |
| 2004/0012590 | A1 | 1/2004 | Kurzweil |
| 2006/0232581 | A1* | 10/2006 | Chen ................. 345/418 |

* cited by examiner

*Primary Examiner* — Michelle K Lay
(74) *Attorney, Agent, or Firm* — Workman Nydegger

(57) ABSTRACT

A leaping iterative composition method of a complicated graphic and a storage medium having a computer program executing the same are described. First, an initiator and generators are set. After several times of iterating, a transitional object is formed. Then, a leaping recursion is performed based on this transitional object. When performing the leaping recursion, a generator of each of the iterations is designed by a single pattern converted from a structural result of a previous iteration added with a base object. Since the result of each of the iterations keeps the original structure, the structure is used as the input initiator. The initiator of the first iteration can be a feature of different iteration objects. Since the input structure of iterations are the same, the advantage of reducing computing resources and avoid system overload are reachable.

8 Claims, 11 Drawing Sheets

LEAPING ITERATIVE COMPOSITION METHOD OF COMPLICATED GRAPHIC AND STORAGE MEDIUM HAVING COMPUTER PROGRAM EXECUTING THE SAME

BACKGROUND OF THE INVENTION

1. Field of Invention

The present invention relates to a computer graphics method, and more particularly to a leaping iterative composition method of a complicated graphic applicable for generating a complicated object structure with a simple geometric object through iteration and generating the complicated graphic by use of leaping iteration of the object structure.

2. Related Art

Scenes in the nature change a lot and seem to have an unpredictable change trend. For example, clouds in the sky, mountains rising and falling, meandering running water, and even flowers, grasses and trees in daily life are widely different in shape and structure. Currently, the drawing of these scenes and objects mostly relies on hands or is performed through drawing software such as Photoshop, Illustrator, AutoCAD, and Visio. The forming of a graphic both on a paper by hands and on a computer by the drawing software requires considerable operation time. It is impossible for ordinary people to draw these graphics in an easy, rapid and precise way.

"Fractal geometry" is a geometric concept developed by the mathematician Benoit Mandelbrot in 1970s. "Fractal" covers irregular line segments or graphics. When studying a line segment and graphic composed of fractals, it is easy to find that detail constructions of the fractals have a feature of "self-similarity" despite of complicated and minute structures and zigzag and meandering edges thereof The so-called "self-similarity" refers to a structure repeating feature with a scale-down in level. A quite complicated graphic structure can be composed of smaller and smaller structures reproduced by such iteration. This "fractal" feature exists in scenes such as snowflake crystals and lightening in the sky. Due to an evolution and popularization of computer technologies, currently, this "fractal" feature has been applied in the field of computer drawing for part of the artistic creation. The repeatedly computing capability of a computer is used to draw natural landscapes in a life-like way or to draw a creation image with a complicated structure and resplendent colors. The user can construct mathematical models and several program instructions realizing "fractal" by use of software such as Matlab, Mathematica, and GSP, and draw an "emulated picture" having a complicated but precise structure through a computer by executing these mathematical models or program instructions.

However, the threshold of operating such kind of software is high, and the composition rules of a graphic to be drawn must be analyzed before drawing the graphic. Moreover, when drawing the graphic, a relatively fine graphic can be obtained only after tens (even hundreds) of iterations of a basic geometric object, which is a considerable consumption of computing resources of the computer. When a general computer executes such kind of (fractal) drawing, the insufficient computing capability of the microprocessor often results in a prolonged time for drawing a picture and even causes system down due to overload of computer operation.

SUMMARY OF THE INVENTION

In view of the above problem that considerable computing resources of a computer must be consumed when constructing a complicated graphic, the present invention is directed to a leaping iterative composition method of a complicated graphic and a storage medium having a computer program executing the same. Multiple iteration objects are set on a structural object generated during iteration, and the generated structural object is converted into a graphic file and duplicated to these iteration objects. Then, the aforementioned actions of converting the structural object into the graphic file and iterating it to the iteration objects are repeated. Therefore, the times of iteration operation can be reduced, thereby saving the computing resources of the computer and speeding up the drawing.

As embodied and broadly described herein, the leaping iterative composition method of a complicated graphic is executed by a computer to draw a complicated graphic with a large amount of similar structures. The method includes (a) setting an initiator and a plurality of generators, and setting a base object and a plurality of iteration objects of the generators; (b) selecting any of the generators and iterating the selected generator to the initiator to generate a transitional object; (c) selecting any of the generators and iterating the selected generator to the transitional object, and repeating the step for several times; (d) using the transitional object in the step (c) as a structural object and setting a plurality of iteration objects on the structural object; (e) converting the structural object in the step (d) into a graphic and adding the base object to form a new generator, and iterating the generator to the iteration objects in the structural object; and (f) repeatedly performing the step (e) and converting the structural object after the iteration into the complicated graphic.

In the leaping iterative composition method of a complicated graphic according to a preferred embodiment of the present invention, the step (a) further includes setting an object size and an object color of the initiator and the generators.

In the leaping iterative composition method of a complicated graphic according to a preferred embodiment of the present invention, the base object and the iteration objects can be one selected from among straight line segment, rectangle, circle, polygon, or irregular graphic.

In the leaping iterative composition method of a complicated graphic according to a preferred embodiment of the present invention, the structures of the initiator and the aforementioned generators can be structures selected from a group consisting of line segment, rectangle, circle, polygon, and irregular graphic.

In the leaping iterative composition method of a complicated graphic according to a preferred embodiment of the present invention, the aforementioned step (b) further includes adjusting a dimension of the selected generator according to a dimensional relationship between the base object of the generator and the initiator, and iterating the generator to the initiator.

In the leaping iterative composition method of a complicated graphic according to a preferred embodiment of the present invention, the selected generators in the step (c) are iterated to positions of the iteration objects on the transitional object.

In the leaping iterative composition method of a complicated graphic according to a preferred embodiment of the present invention, the multiple iteration objects in the step (d) are set at the positions of the iteration objects of the transitional object in the aforementioned step (d).

In the leaping iterative composition method of a complicated graphic according to a preferred embodiment of the present invention, the step (e) further includes adjusting a dimension of the graphic according to dimensions of the iteration objects, and iterating the graphic to the iteration objects of the structural object.

In order to achieve another objective of the present invention, the present invention provides a storage medium having a computer program executing the aforementioned leaping iterative composition method of a complicated graphic. This computer program can be read from the storage medium and executed through an executable platform of a computer. The computer program stored by the storage medium can also be attached to other drawing programs, browser programs or any application programs that can open a graphic file, and can draw a complicated graphic by performing various steps of the aforementioned leaping iterative composition method of a complicated graphic.

The computer program includes a human-machine interface for a user to set an object size, a shape and a color of the initiator, the generator, or a plurality of iteration objects on the structural object. The user selects the group of line segment, rectangle, circle, polygon, or irregular graphic to compose the above initiator and the generators by the human-machine interface, and sets the base object line and a plurality of iteration objects on the generators. Both a relative angle and relative position for the iteration of the generator to the initiator and a relative angle and relative position for the iteration of the generator to a transitional object can be adjusted through this human-machine interface. In addition, the user can also set repeatedly performing times of the step (f) of the aforementioned leaping iterative composition method of a complicated graphic, set a stop of the performing of the step (f), or set a continue of the performing of the step (f) through the human-machine interface.

In view of the above, the leaping iterative composition method of a complicated graphic and the storage medium having the computer program executing the same of the present invention uses the transitional object generated by the iteration as a new exponential generator and continues the iteration with this exponential generator, thereby reducing the iteration operation times, saving the computing resources of the computer, enhancing the drawing speed, and avoiding the phenomenon of system down resulted from an overload operation.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objectives and executing method thereof of the present invention are illustrated in detail in the following preferred embodiments, and the concept of the present invention is also applicable to other scopes. The embodiments described below are used for illustrating the objectives and executing method thereof of the present invention, instead of limiting the scope of the same.

Figure 1:
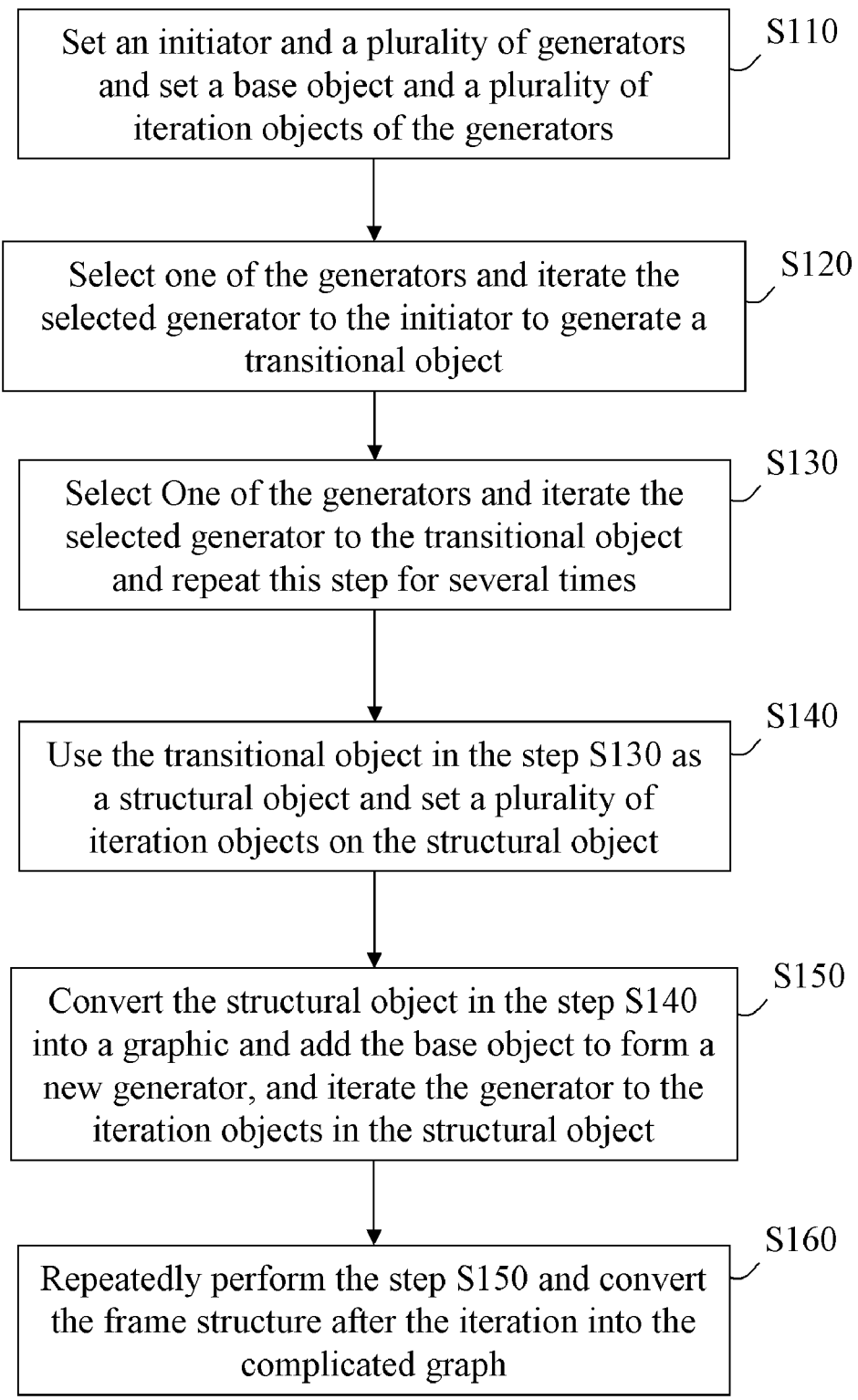
FIG. 1 is a flow chart of a leaping iterative composition method of a complicated graphic according to the present invention.

FIG. 1 is a method flow chart of a leaping iterative composition method of a complicated graphic according to the present invention. Referring to FIG. 1, the leaping iterative composition method of a complicated graphic (the present composition method for short) is executed by a computer or an electronic device platform with computing capability to draw a complicated graphic with a large amount of similar structures. Articles such as flowers, grasses and trees, snowflake structures, and shell patterns in the nature can be rapidly drawn by the present composition method. In addition, artistic creations with a large amount of similar structures can also be rapidly drawn by the present composition method.

The present composition method includes the following steps. First, an initiator and a plurality of generators are set, and a base object and a plurality of iteration objects of the generators are set (step S110).

Next, one of the generators is selected and the selected generator is iterated to the initiator to generate a transitional object (step S120). One of the generators is selected and the selected generator is iterated to the transitional object, and the step is repeated for several times (step S130). Then, the transitional object in the step S130 is used as a structural object and a plurality of iteration objects on the structural object are set (step S140). Afterward, the structural object in the step S140 is converted into a graphic and the base object is add to form a new generator, and the generator is iterated to the iteration objects in the structural object (step S150). Finally, the step S150 is repeatedly performed and the structural object after the iteration is converted into the complicated graphic (step S160).

The structure of the initiator and the generators is a structure composed of a group of line segment, rectangle, circle, polygon, and irregular graphic. The structure of the initiator and the generators are not limited herein. A user can set an initial structure of the initiator or the generators through a human-machine interface. For example, the initiator is set to be a straight line segment. During an initialization of the initiator and the generators, i.e., the step S110, the user can also set an object size and an object color of the initiator and the generators through the human-machine interface. Upon initializing the initiator, the generators, the base object on various generators and the iteration objects and setting the times of iterating the generator to the transitional object, a dimension of the generator is adjusted according to a dimensional and proportional relationship between the base object on the generator and the initiator. The base object and the iteration object referred to herein may be a straight line segment, a rectangle, a circle, a polygon, or an irregular graphic. Then, the adjusted generator is iterated to the initiator. In this embodiment, the adjusted generator is directly covered on the initiator. At this time, the image obtained is referred to as a transitional object.

In some embodiments, the user may rotate the initiator through the human-machine interface such that a relative angle is formed between the generator and the initiator, or move the generator through the human-machine interface in order to change a relative position of the generator to the initiator. In this way, subtle changes can be made to the transitional object in a visual manner.

Subsequently, after the generator is iterated to the initiator, the generated transitional object inherits the plurality of iteration objects on the original generator, i.e., uses the plurality iteration objects of the original generator as its own iteration objects. In a next round of the iteration, the generator is iterated to the positions of the iteration objects on the transitional object according to a dimensional proportion between the iteration objects and the selected generator. After iterating the generator to the iteration objects on the transitional object in this way for several times, a transitional object with a relatively complicated structure is obtained. When iterating the generator to the transitional object continuously, the total number of the iteration objects on the transitional object exponentially grows. For example, after a two rounds of the iteration of a generator containing 5 iteration objects, 25 iteration objects exist in the resulting transitional object, and after a three rounds of the iteration, 125 iteration objects exist. Drawing a complicated graphic with this method causes an exponential growth of the iteration objects on the tip of the transitional object and thus a waste of computing resources for the iteration operation.

Accordingly, in the present invention, after generating the transitional object (or iterating the generator to the transitional object for several times), the transitional object is further used as the structural object, and a plurality of iteration objects of the structural object are set with the positions of the iteration objects on the transitional object.

Then, the structural object is converted into a graphic and the base object is added to form a new generator. And then, the new generator is iterated to the iteration objects in the structural object. During the iteration, after adjusting the dimension of the aforementioned generator, i.e., the new generator formed by the graphic converted from the structural object added with the base object according to dimensions of the iteration objects, the generator is iterated back to the iteration objects on the structural object.

The user can also adjust a relative angle and relative position for the iteration of the new generator to the iteration objects of the structural object through a human-machine interface, i.e., after the iteration of the aforementioned new generators to the corresponding positions of the structural object, rotate or slightly move the new generators substituted into the structural object. Similarly, the user can also adjust a color, size and shape (such as a rectangle or trapezoid) of the iteration objects on the structural object through the human-machine interface. In addition, in some other embodiments, the human-machine interface is further provided for the user to set repeatedly performing times of the aforementioned step S150, set a stop of the performing of the step S150, or set a continue of the performing of the step S150.

It is to be noted that, since the number of the iteration objects on the structural object is constant, the operation amount of converting the structural object into a graphic and iterating it back to the iteration objects of the structural object is fixed each time. When a complicated graphic is drawn not using the composition method of a frame structure, the operation amount grows exponentially, while the operation amount is maintained at a constant when the frame structure is used to perform the iteration. It can be seen that the present invention does reduce the operation amount of the iteration.

To clarify the present composition method, a preferred embodiment is used to illustrate a process of drawing a complicated graphic by the present composition method. In this preferred embodiment, a storage medium (such as a hard disk, a soft disk or a magnetic disk drive) has a computer program stored therein which can execute the present composition method. After being read from the storage medium, this computer program is loaded to be attached to the well-known Power Point software to be executed. The computer program may also be loaded or installed in other drawing programs (such as Photoshop image editing software), browser programs (such as IE web browser), or any application programs which can open a graphic file (such as the little artist), so as to execute the present composition method to draw the complicated graphic. The presentation mode of the computer program is not limited herein.

Figure 2A:
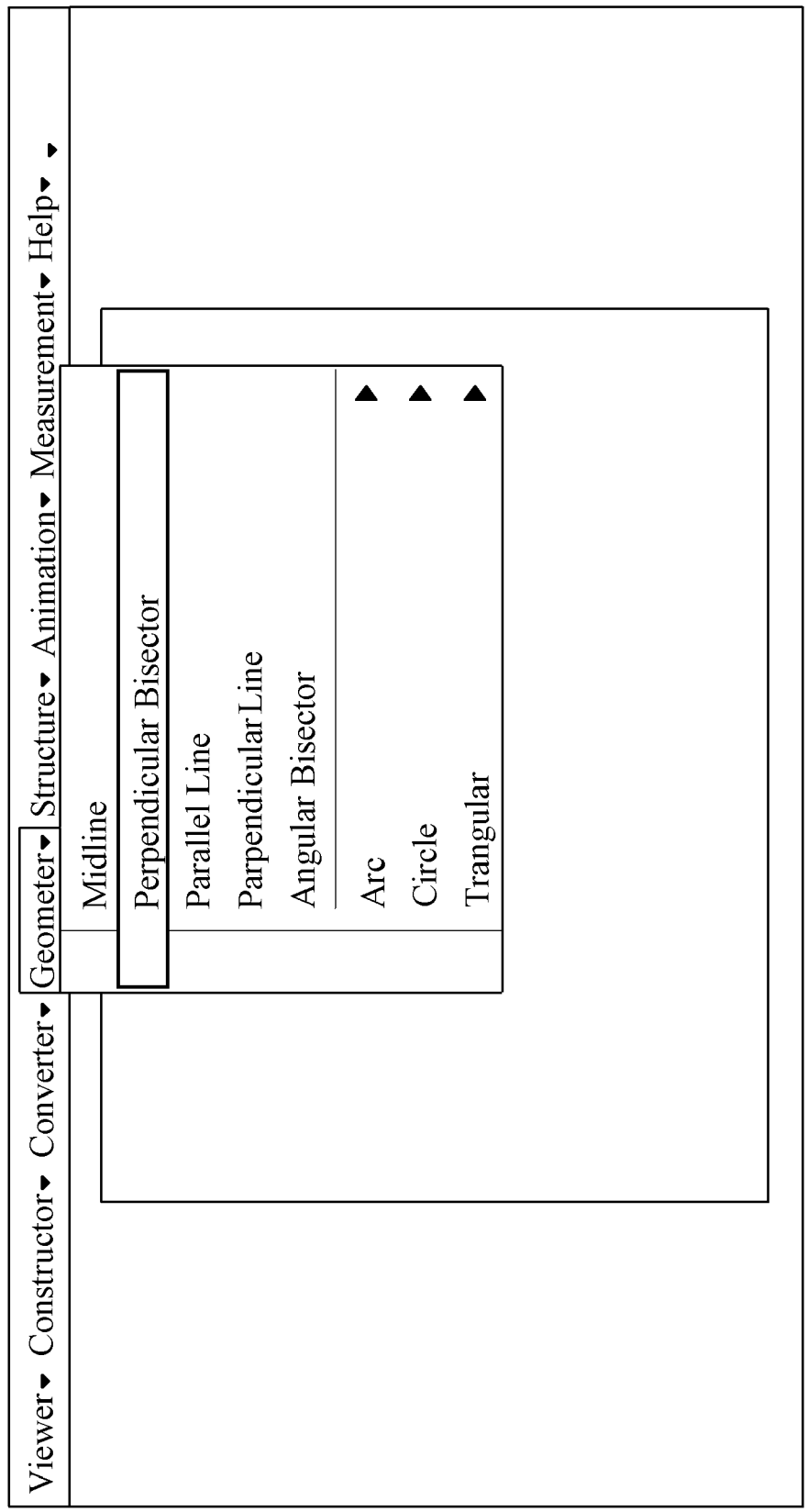
FIGS. 2A and 2B are schematic views of a human-machine interface of the leaping iterative composition method of a complicated graphic.
Figure 2B:
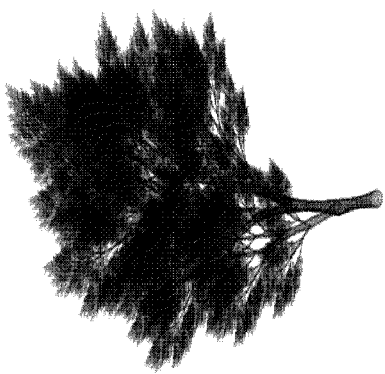

FIGS. 2A and 2B are schematic views of a human-machine interface of the leaping iterative composition method of a complicated graphic. Referring to FIGS. 2A and 2B sequentially, the user sets a shape, color, and object dimension of the initiator and the generator by the human-machine interface in the FIG. 2A. The user may use the mouse to click the upper function menu to select a function to be executed to perform the drawing, or use the hot key to call a required drawing function. The tree with dense branches and leaves in FIG. 2B is the complicated graphic drawn by use of the aforementioned computer program. The tree which seems complicated in fact is composed of dots, line segments, rectangles, circles, polygons, and irregular graphics. The user only needs to select the basic shapes (such as the aforementioned dots, line segments, rectangles, circles, polygons, and irregular graphics) composing the initiator and the generator, and adjust bending angles of the branches and leaves visually to complete a life-like tree.

Figure 3A:
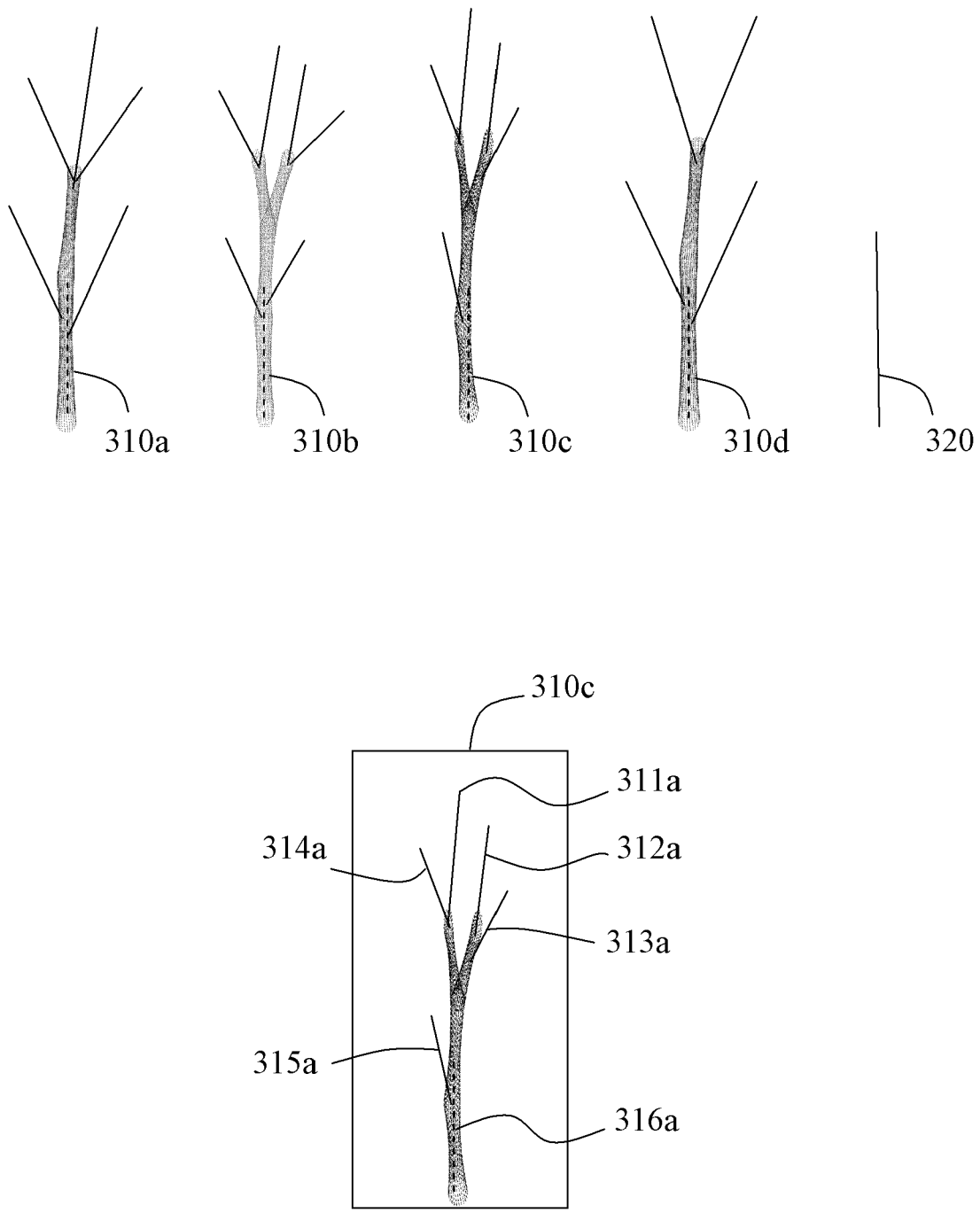
FIGS. 3A to 3H are schematic views of a drawing process of the complicated graphic according to a preferred embodiment of the present invention.
Figure 3B:
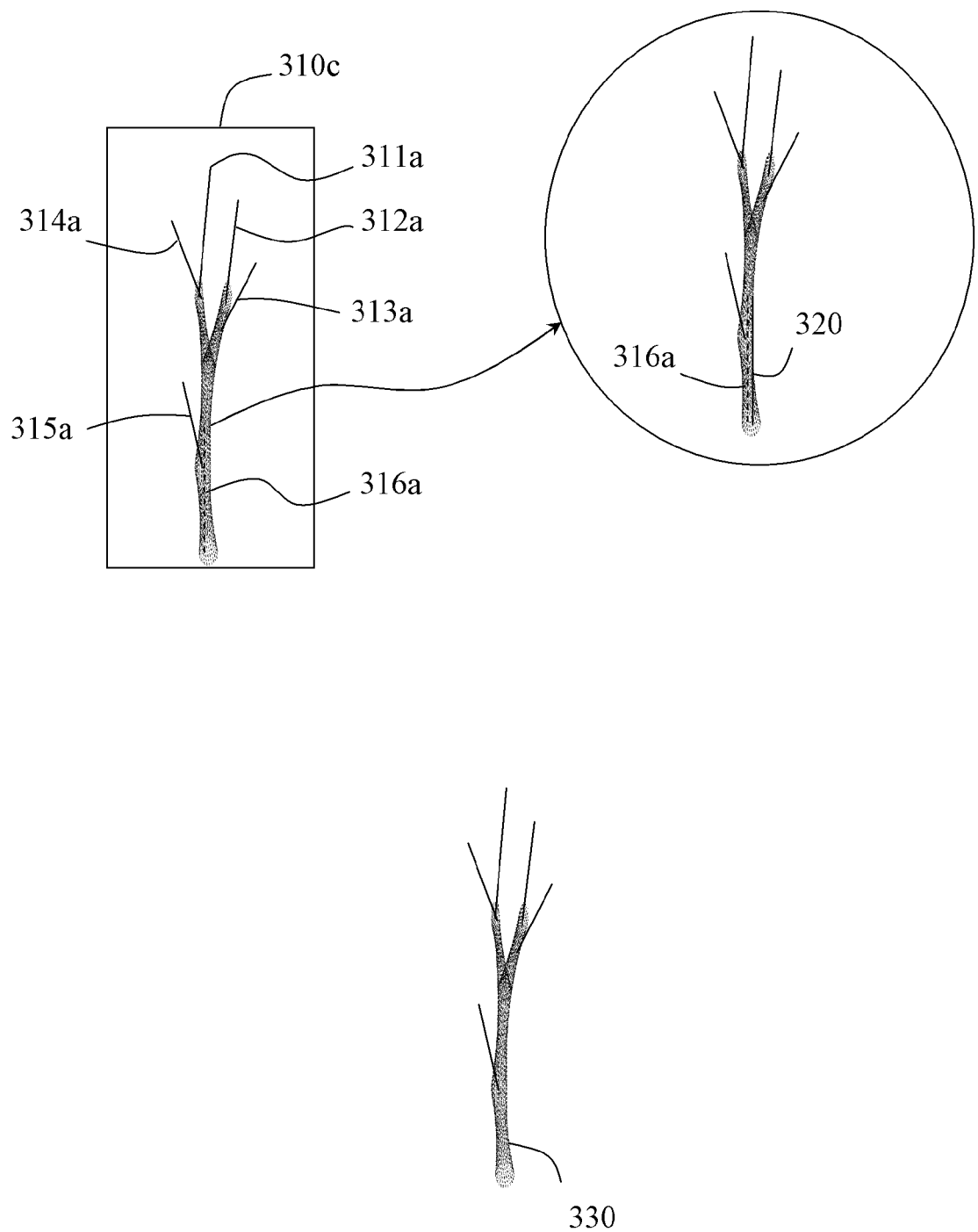

FIGS. 3A to 3H are schematic views of a drawing process of the complicated graphic according to a preferred embodiment of the present invention. First referring to FIG. 3A, the user selects generators initialized as a generator 310c to be substituted into an initiator 320 and sets a base object line 316a and a plurality of iteration lines 311a to 315a on the generators with the aforementioned man-machine interface. Referring to FIG. 3B, first, the generator 310c is iterated to the initiator 320. The default iteration mode is to adjust the generator 310c according to a dimensional relationship between the base object 316a, for example, a dashed line segment in this embodiment in the generator 310c and the initiator 320, and to iterate the generator 310c on the initiator 320 (as the schematic graphic in the solid circle of FIG. 3B) to form a transitional object 330 (as shown in the lower half graphic of FIG. 3B). The user may further set a relative angle and position of the generator 310a to the initiator 320 during the iteration through the human-machine interface.

Figure 3C:
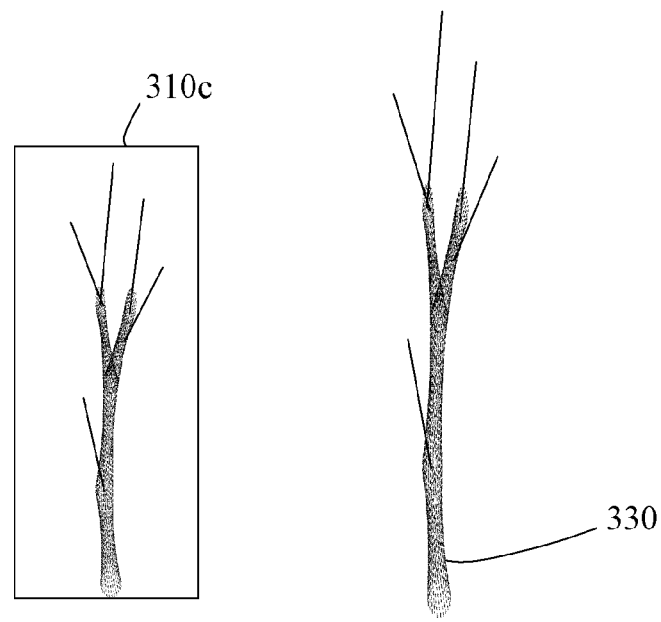
Figure 3C:
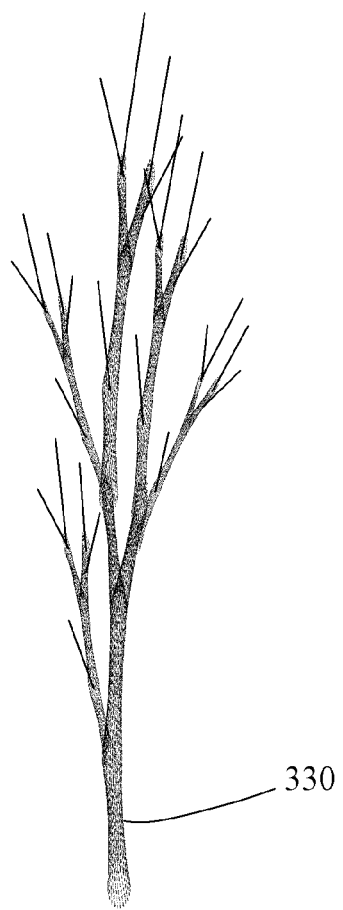
Figure 3D:
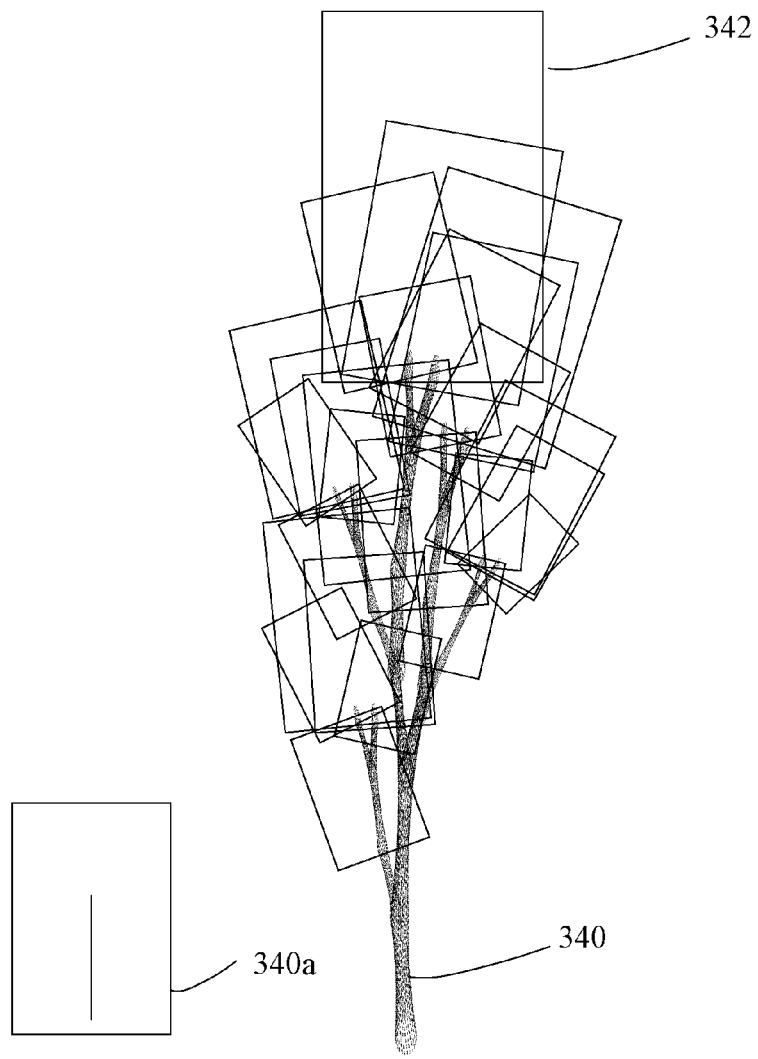
Figure 3D:
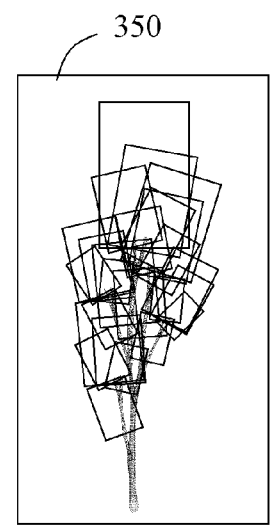

Then referring to FIG. 3C, the object structure after the iteration is referred to as the transitional object 330. After generating this transitional object 330, the generator 310c is again iterated back to the iteration objects of the transitional object 330, i.e., the thin straight line segments in the transitional object 330 in the upper half of FIG. 3B. The system, i.e., the computer program, automatically adjusts a dimension of the exponential generator 310c according to a length of the iteration objects. In some embodiments, other generators, for example, the generators 310a, 310b, or 310d may also be selected to be iterated to the transitional object 330. In this embodiment, the generator 310c is still selected to perform the iteration. It is found from this figure that a considerable amount of iteration objects (thin line segments) have already existed in the tip of the tree structure. At this time, a generator 340a is formed, as shown in FIG. 3D. The system (or the compute program) uses the generator 340a to set a plurality of iteration objects 342 on this structural object 340 as shown in FIG. 3D. The iteration objects 342 in FIG. 3D are set at the positions of the multiple iteration objects, for example, the thin line segments in the tree tip on the transitional object 330 as shown in FIG. 3D.

Figure 3E:
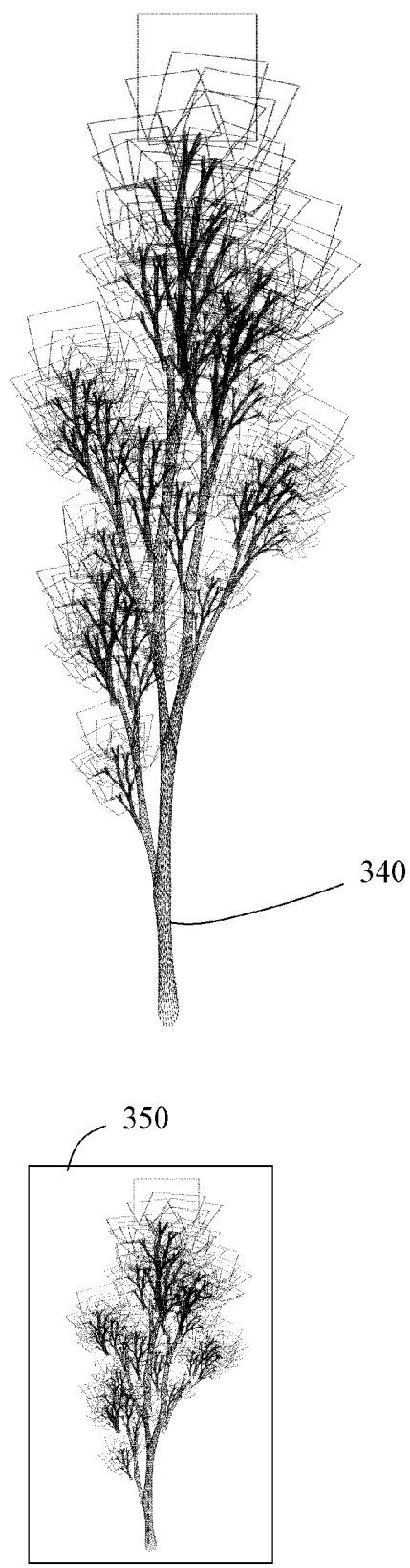
Figure 3F:
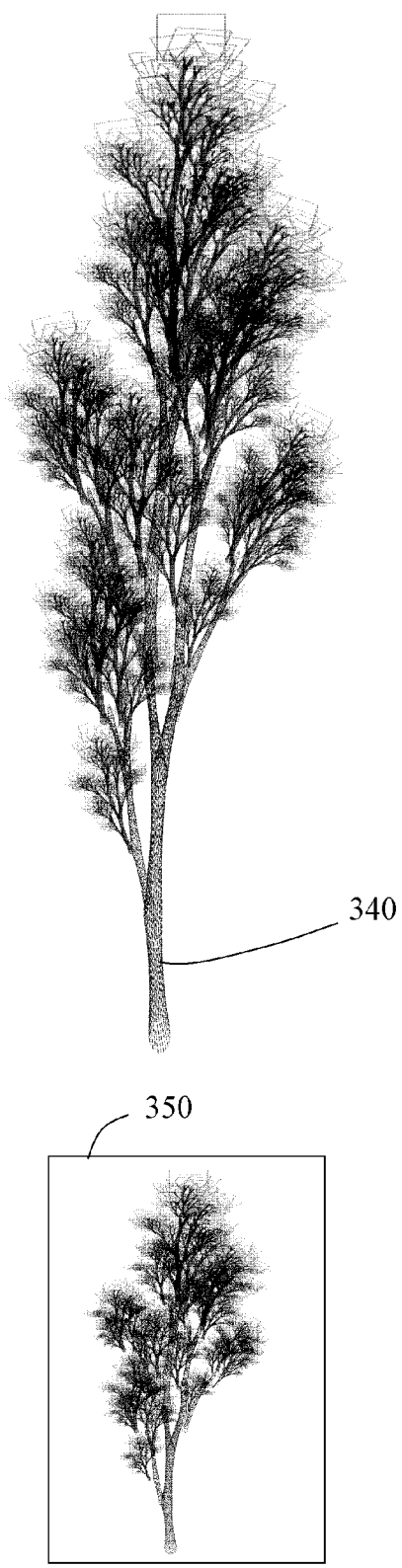
Figure 3G:
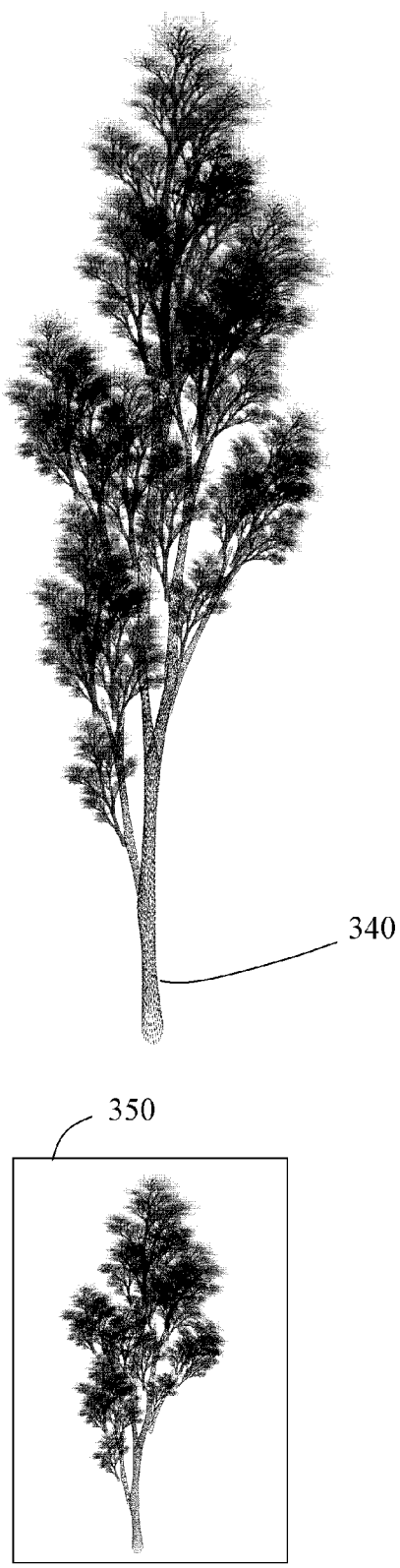
Figure 3H:

Referring to FIG. 3D again, the structural object 340 is converted into a graphic and a frame as a base object is added so as to form a new generator 350. Then, the new generator 350 is iterated back to each of the iteration objects of the structural object 340 shown in FIG. 3D. The transitional object 340 as shown in FIG. 3E can be generated after the iteration. At this time, if the iteration is to be performed again, the transitional object 340 in FIG. 3E is converted into a graphic and the base object is added again to form the new generator 350, which is then iterated to the structural object 340 shown in FIG. 3E to generate a new transitional object 340 as shown in FIG. 3F The transitional object 340 in FIG. 3F is then again converted into a graphic and the base object is added again to form the new generator 350, which is then iterated to the structural object 340 shown in FIG. 3F to generate a new transitional object 340 as shown in FIG. 3G The same process is performed again to generate a complicated graphic 360 as shown in FIG. 3H. This process may require less memory and operate easily. Alternatively, the generator 350 in FIG. 3E may be iterated to the structural object 340 shown in FIG. 3D. Similarly, the generator 350 in FIG. 3F, may be iterated to the structural object 340 shown in FIG. 3D the generator 350 in FIG. 3G may be iterated to the structural object 340 shown in FIG. 3D, or 3E. The iteration objects 342 of the aforementioned structural object 340 may be, for example, line segments, frames, rectangles, polygons, or circles. The outline of the iteration objects is not limited herein. In addition, some of the iteration objects 342 may be colored instead of the blank frame as in FIG. 3D. Some of the iteration objects 342 in FIG. 3E to FIG. 3G may also be colored as well. In FIG. 3E to FIG. 3G, it is noted that the transitional object 340 have the same structure as the transitional object 340 shown in FIG. 3D. Using different generators to perform iteration result in the different appearance in those figures.

Till now, the tree drawn by the system (the computer program) has been quite dense. During the drawing process, if the branches and leaves of the tree are not dense enough in the user's opinion, the user can further set a continue of the performing of the aforementioned iterating steps, i.e., after setting the resulting iterated result to be a graphic, iterate it back to each of the iteration objects of the structural object again. If the user thinks the interleaving degree of the branches and leaves of the tree is enough, he/she may stop the performing of the iterating steps by issuing a Stop command. The user may also set the iteration times so that the system (the computer program) automatically stops the iteration action after completing the set iteration times and outputs a completed complicated graphic (the complicated graphic described in this embodiment is a tree with dense branches and leaves).

In view of the above, during the drawing of a complicated graphic with a large amount of similar structures in the present invention, the system (the computer program) uses the result after several times of iterating as the structural object, uses the positions of the iteration objects as the iteration objects on the structural object, and iterates the structural object back to the iteration objects on the structural object by iteratively converting the structural object into a graphic to obtain a relatively fine and complicated picture. Since the number of the iteration objects on the structural object is fixed, the operation amount of each of the iterations is equal. Therefore, the present invention at least has the following advantages.

1. The times of required iteration is greatly reduced and the computing resources of the computer for drawing the complicated graphic are saved.

2. The speed of drawing the complicated graphic is enhanced.

3. The former phenomenon of instability or down of the computer system resulted from overload operation when drawing the complicated graphic are alleviated.

What is claimed is:

1. A leaping iterative composition method of a complicated graphic, executed by a computer to draw a complicated graphic with a large amount of similar structures, the method comprising:
    (a) setting an initiator and a plurality of generators, and setting a base object and a plurality of iteration objects of the generator;
    (b) selecting any of the generators and iterating the selected generator to the initiator to generate a transitional object;
    (c) selecting any of the generators and iterating the selected generator to the transitional object, and repeating the step for several times;
    (d) using the transitional object in the step (c) as a structural object and setting a plurality of iteration objects on the structural object;
    (e) converting the structural object in the step (d) into a graphic and adding the base object to form a new generator, and iterating the new generator to the iteration objects in the structural object executed by the computer; and
    (f) performing the step (e) repeatedly and converting the structural object after the iteration into the complicated graphic.

2. The leaping iterative composition method of a complicated graphic as claimed in claim 1, wherein the step (a) further comprises setting an object size and an object color of the initiator and the generators.

3. The leaping iterative composition method of a complicated graphic as claimed in claim 1, wherein the base object and the iteration objects are selected from a group consisting of straight line segment, rectangle, circle, polygon, and irregular graphic.

4. The leaping iterative composition method of a complicated graphic as claimed in claim 1, wherein the structures of the initiator and the generators are structures selected from a group consisting of line segment, rectangle, circle, polygon, and irregular graphic.

5. The leaping iterative composition method of a complicated graphic as claimed in claim 1, wherein the step (b) further comprises adjusting the selected generator according to a dimensional relationship between the base object of the generator and the initiator, and iterating the generator to the initiator.

6. The leaping iterative composition method of a complicated graphic as claimed in claim 1, wherein the selected generators in the step (c) are iterated to positions of the iteration objects of the transitional object.

7. The leaping iterative composition method of a complicated graphic as claimed in claim 1, wherein the iteration objects in the step (d) are set at the positions of the iteration objects of the transitional object.

8. The leaping iterative composition method of a complicated graphic as claimed in claim 1, wherein the step (e) further comprises adjusting a dimension of the graphic according to the dimensions of the iteration objects and iterating the graphic to the iteration objects of the structural object.

* * * * *